Patented Mar. 14, 1939

2,150,148

UNITED STATES PATENT OFFICE 2,150,148

WATER SOLUBLE RESINOUS CONDENSATION PRODUCTS

Albert Henry Bowen and Theodore Williams Dike, Seattle, Wash., assignors to I. F. Laucks, Inc., Seattle, Wash., a corporation of Washington No Drawing. Application August 13, 1936, Serial No. 95,936

3 Claims. (Cl. 134—23.3)

This invention relates to dry forms of water soluble resinous condensation products of zinc chloride, urea and formaldehyde, this application being a continuation-in-part and with respect to the common subject matter of application Serial No. 7,704, filed February 23, 1935, which was a continuation-in-part and with respect to the common subject matter of its co-pending application Serial No. 728,678, filed June 2, 1934, that being a continuation-in-part and with respect to the common subject matter of a co-pending application Serial No. 666,930, filed April 19, 1933 (Patent No. 1,992,180, Feb. 26, 1935).

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

As water soluble we include both products which are completely soluble in either cold or hot water and also products which, while only a portion completely dissolves, yet retain a sufficient degree of solubility in the remainder so that the whole material may be used industrially in an aqueous medium without requiring a protective colloid to prevent an incompletely dissolved fraction settling out and destroying the uniform, homogeneous character of the resulting fluid material. For instance for the purposes of this invention we characterize any products as soluble that in the form of a fine powder and without the addition of a protective colloid may be mixed with water to form a spreadable glue which, after drying on the spread surfaces, will provide an adherent, resinous film of a uniform character.

As described in the above-mentioned applications, new and useful products are made by reacting together between 2 and 57 parts of zinc chloride, 100 parts of urea, and between 230 and 300 parts of commercial 37% formalin, the parts being by weight, and condensation products being formed, including products made at elevated temperatures and others made at room temperature or below, and it being pointed out that the reaction proceeded by stages, the initial reaction products consisting of colloidal sols, these being followed when the reaction is carried out without the use of external heat, by the formation of a mush-like precipitate. We also stated that when controlled external heat is used to promote the reaction more or less viscous liquors or syrups could be produced of considerable stability and that if the reaction was stopped at an early stage then these syrups might be completely water soluble.

The object of the present invention is the complete stabilization and concentration of these water soluble liquid products in the industrially convenient form of equivalent water soluble dry powders. We find that this object can be obtained by carefully controlled drying and the resulting powders are ideally adapted to a variety of important industrial uses.

*Example 1.*—56 parts by weight of fused zinc chloride are dissolved in 1180 parts 37% formalin, the latter being of normal acidity not more acid than pH 3. To this mixture 456 parts of urea and 8 parts of sucrose are added. The material is then rapidly heated to about 170° F., held at that temperature for about 30 minutes, and then rapidly cooled to room temperature. The product is a rather viscous syrup, and is soluble in water in all proportions if the reaction is not permitted to go too far. The syrup may be either clear or slightly cloudy. This syrup is then spray dried at a temperature of about 175° F. which produces a water soluble powder, provided the spray drier is equipped to discharge and cool the powder to room temperature as fast as it is dried. This powder is then mixed with a small amount of talc to give it a better physical character, and then 25% of fine ground urea is mixed in. The resulting powder when mixed up with a small amount of water makes a valuable adhesive with a wide range of usefulness.

This powder is now being manufactured on a large scale and has come into extensive commercial use as a plywood glue. It has very remarkable properties. If the liquor is reacted a minimum amount and the drying carried out with a minimum exposure to heat the powder has the unheard of low water requirement of 0.3—that is one pound of powder will dissolve in 0.3 lb. of water to make a spreadable viscous glue with a MacMichael No. 26 wire viscosity of about 50, this consistency being appropriate for spreading with either a brush or mechanical spreader. With slightly more heat treatment powders with higher water requirements may be produced and it becomes easily possible to produce any quantity at a predetermined water requirement. The powder is exceedingly stable and keeps indefinitely in tight containers at ordinary temperature.

The properties of the mixed glue are equally remarkable. If spread on plywood at the rate of about 7.5 to 15 pounds of dry substance per 1000 square feet of single glue line and the plywood is hot pressed at about 225° F. for a very short time an extremely strong, colorless, stainless and highly water resistant bond is formed. A noteworthy feature is that this powder produces the fastest bond of any known synthetic resin plywood adhesive and at such a low temperature that no injury to the wood is caused by the heat. As compared to well known phenolic resin adhesives the press output is trebled and the excessive heat treatment required by the phenolic resins is avoided. The low water requirement provides the convenience of fluid spreading without the water injected being sufficient to appreciably swell the wood.

This particular formula may be replaced by many other formulae capable of producing water soluble liquors with other proportions of zinc chloride, urea and formaldehyde within the limits of combination and corresponding water soluble powders may similarly be produced as will be readily apparent to anyone skilled in the art. Also other methods of low temperature drying may be substituted such as drum drying or water extraction by a non-reactive solvent for water in which the resin is insoluble. Acetone has these properties and may be used as a means of extracting the water from the clear initial reaction mixtures made at low temperature or from mush-like products of low temperature reactions. However, for most purposes we prefer the method of low temperature spray drying.

We believe the powders resulting from carrying out the methods herein disclosed are the first commercially successful thermo-setting synthetic resin in water soluble dry powder form. It is notable also that the aqueous glue made from the product of this example is so exceedingly reactive that if applied as a glue to certain slightly acid woods such as Douglas fir, it is capable of forming an excellent bond, also of high water resistance, under the influence of cold pressure alone. This also is a degree of reactivity never previously attained by any synthetic resin adhesive available in a stable dry form without the addition of any other reagent than water.

These remarkable properties of the resin are due to the unique reaction product of zinc chloride, urea and formaldehyde, which equals in adhesive power any previous synthetic adhesives, and in the valuable property of ability to set at high speed and with low heat, far exceeds the earlier products of urea and formaldehyde or of phenol and formaldehyde.

Many other uses of these water soluble powders such as for making impregnated paper, stiffening various materials, paper sizing and making a variety of laminated products will be readily apparent to anyone skilled in the art. The colorless, stainless character of the resin readily allows the use of dyes which permits the manufacture of a complete range of colors in laminated products and the like.

Other modes of applying the principle of the invention may be employed instead of these herein explained, change being made as regards the details disclosed, provided the features stated in any of the following claims, or the equivalent of such, be employed.

We therefore particularly point out and distinctly claim as our invention:

1. A water soluble potentially reactive synthetic resin adhesive material in dry state comprising a partially reacted reaction product of zinc chloride, urea, a sucrose, and formaldehyde.

2. A water soluble potentially reactive synthetic resin adhesive material in dry state comprising a partially reacted reaction product of zinc chloride, urea, a sucrose and formaldehyde, and added urea.

3. The process of treating a liquor resulting from the reaction of $ZnCl_2$, urea and formalin, the $ZnCl_2$ being present in from 2–57 parts thereof to each 100 parts of urea and 230–300 parts formalin, which comprises spray drying the same at a temperature of about 175° F. to produce a powder, and cooling the powder to room temperature as fast as it is dried while selectively regulating the amount of heat treatment to produce a powder which is adapted to form a spreadable glue solution in either cold or hot water and has a predetermined water requirement in relation to the amount of heat treatment which can be as low as 0.3 pound of water for each pound of glue powder.

ALBERT HENRY BOWEN.
THEODORE WILLIAMS DIKE.